/ Patented Nov. 2, 1937

2,098,010

UNITED STATES PATENT OFFICE 2,098,010

PREPARATION OF EMULSIONS

Roy C. Newton, Walter F. Bollens, and Leo C. Brown, Chicago, Ill., assignors to Industrial Patents Corporation, Chicago, Ill., a corporation of Delaware No Drawing. Application December 7, 1934, Serial No. 756,506. In Canada April 28, 1933

14 Claims. (Cl. 99—122)

This invention relates on an improved process for treating oleomargarine, butter and similar emulsions. One of the objects of this invention is to provide a method for manufacturing products of this character whereby a very finely emulsified product is produced. Other objects will be apparent from the description which follows.

This application is a continuation in part of our application entitled Method of chilling and emulsifying oleomargarine, etc., Serial No. 660,459, filed March 13, 1933.

In this specification the manufacture of oleomargarine will be discussed as an example. It will be understood, however, that the discussion of oleomargarine is by way of illustration and not by way of limitation.

In the manufacture of oleomargarine, it is customary to mix or churn milk and salt with melted oils forming an emulsion which is chilled by spraying directly into cold water or chilling on a refrigerated drum. It has also been proposed to add milk to heated oil in a vessel provided with agitators, producing an emulsion which after maturing and salting, is cooled by cold water circulating through a jacket about the vessel, the emulsion being agitated during cooling. However, this method has been little used in commercial practice.

The type of chilling which results from any of the foregoing methods causes rapid crystallization of the continuous phase of the emulsion. Since the heat of crystallization is absorbed by the refrigerating medium as rapidly as it is formed, the dispersed phase, namely the moisture of the milk, tends to separate from the oil due to the break down of the emulsions when the fat solidifies. As a result droplets of water leak from the product resulting in damage to the carton of packaged goods and shrinkage in weight from evaporation. The loss of the moisture affects the color of the finished product, its spreading qualities, and its flavor. The presence of large droplets of water causes a tendency to spatter if the product is used for frying and the like.

The present invention provides a process of manufacturing oleomargarine in which the water remains finely dispersed throughout the fat after solidification. This fine dispersion prevents leakage, spattering and the like. In industrial baking and household cookery, it is common practice to use a large percentage of butter or oleomargarine in the fabrication of cakes because of the desirable butter aroma and flavor thus imparted to the finished product.

Fineness of texture in the finished cake requires a shortening of better creaming qualities than ordinary butter or oleomargarine, and it has consequently been the practice to mix some other shortening of better creaming quality with the butter or oleomargarine in cake making.

Oleomargarine or butter prepared in accordance with the present invention has very desirable creaming qualities, and is rendered satisfactory for use in cake batter without the addition of any other special shortening.

In United States Patent No. 1,911,222, granted May 30, 1933, on the application of two of the applicants herein, is described and claimed a method of controlling the crystal structure of fats and their ultimate creaming qualities when used as shortenings. In this patent it is shown how the crystal structure and ultimate creaming quality can be controlled on a practical scale in shortenings per se. The present invention relates to emulsions of water and fat with other ingredients having desirable characteristics including excellent creaming qualities.

As has been pointed out in the patent to which reference has heretofore been made, a shortening product when chilled over a conventional refrigerated roll, is crystallized almost entirely while in contact with the surface of the chill roll. Inasmuch as the heat of crystallization is absorbed by the roll as fast as it is formed, there is no opportunity for any material increase in the temperature of the fat by reason of the heat of crystallization and consequently crystallization is very rapid. It is obvious in this, as in the ordinary chilling operation, that most of the crystallization takes place at a temperature somewhere between the congealing point of the fat and the low temperature of the chill roll.

In accordance with the teachings of the heretofore mentioned patent, the fat is supercooled to a temperature of perhaps 15° or 20° below the congealing point. This chilling is done very rapidly and the supercooled fat passes from contact with any chilling medium before any appreciable crystallization takes place. The crystals immediately begin to form and as the first crystals form, the heat of crystallization raises the temperature to a point almost up to the congealing point of the fat. Due to this raise in temperature by reason of the heat of crystallization, the remainder of the crystallization follows at a much slower rate, holding the temperature of the product at or close to the congealing point for a considerable period of time during which the first crystals formed have an opportunity to increase in size resulting in a product with much larger crystals than can be obtained by the conventional method of chilling over a chilling roll.

As taught in the said patent, by controlling the degree of supercooling, and the temperature of the holding room after packaging, it is possible to produce any size crystal desired, ranging from a very fine grained product, as would be obtained by chilling over a chill roll, to a very grainy product such as would be obtained if the material were packaged while warm and set in the cooler to crystallize slowly.

We have found that coarse emulsions, when passed through proper equipment for supercooling the fat, in the manner which has just been discussed, and then agitated while in a supercooled condition, become further dispersed and a very fine emulsion is formed. We have found that milk or water emulsifies very readily and with extreme ease when agitated with fats which are in a supercooled condition. The agitation of the fat in a supercooled condition causes a very fine dispersion of minute droplets of the dispersed phase of the emulsion. The supercooled product crystallizes or sets up so rapidly that no opportunity is afforded for the coalescence of the finely divided moisture and, consequently, no large droplets are formed. This results in a very fine, stable emulsion.

In its broadest aspect our invention contemplates the formation of emulsions with supercooled fat. The fineness of dispersion of the dispersed phase may be controlled by varying the amount of agitation and the point at which the dispersed phase is added to the continuous phase.

One method we have successfully employed in the preparation of oleomargarine is as follows: The fats are melted and mixed and passed through a machine adapted to supercool the melted fat. We have in practice successfully employed a machine such as is described and claimed in United States Patent No. 1,952,638 to Taylor.

The milk together with water, where desired, and other ingredients for preservation or flavoring, such as salt, are mixed together and added to the fat just before the fat leaves the chilling machine. In the case of the Taylor machine the milk may be added in the last plate of the chilling machine. By this method the fat is supercooled before the emulsification with the milk takes place and the fat and milk are subjected to much less agitation than when a preliminary emulsion is prepared which is then put through the Taylor machine to be supercooled. This method of treatment produces a very stable emulsion having characteristics which are very desirable for oleomargarine.

Where it is desired to produce an emulsion with an extremely fine dispersion of the dispersed phase we prepare a preliminary emulsion which is then treated to supercool the fat. In practicing this method we prepare a mixture of fats which will have the desired consistency when chilled. These fats are melted and mixed with the correct proportion of milk or water together with other ingredients for preservation or flavoring. The mixture is then mixed to form a coarse emulsion so that a stream flowing from the pre-mixer will contain a proportionate amount of each of the ingredients. This coarse emulsion may then be conducted through or over any type of equipment which will extract heat rapidly enough to effect supercooling. The equipment may be so constructed that the material is agitated rapidly while the heat is being removed, or similar results may be secured by agitating the material rapidly immediately after the heat has been extracted but before any appreciable crystallization has taken place.

In carrying out the present invention in the foregoing manner, the emulsion leaves the point of contact with the heat exchanging surface in a fluid condition. This liquid product, after being further agitated, is allowed to flow into a package where it sets to a very hard, brittle consistency. The exact consistency, of course, depends upon the formula of the product. This hard material is then allowed to temper under such conditions that the product returns to a plastic, spreadable consistency.

It will be seen, therefore, that the present invention which is concerned with the preparation of tight or stable emulsions by supercooling the fat may be carried out either by preparing a preliminary emulsion and then supercooling the fat in the emulsion or by adding milk or water to a fat which has already been supercooled, permitting congelation or crystallization to take place after the addition of the milk or water to the supercooled fat.

It is to be understood that the term "oil" as used in the claims is used in its broadest sense as including fats.

We claim:

1. The method of preparing emulsions which consists in first preparing a coarse emulsion by the intermixture of oil and moisture, thereafter supercooling the mixture, agitating during and after the cooling, removing from contact with chilling media before any appreciable crystallization has taken place whereby the heat of crystallization will maintain the material near the congealing point of the oil during crystallization, permitting crystallization to continue until the product has set up as a hard, brittle mass and thereafter tempering to bring about the desired plasticity of the fat in the emulsion.

2. The method of preparing an emulsion of oil and water which comprises melting the oil, adding water, quickly cooling the oil to a temperature considerably below its congealing point, immediately agitating the mixture sufficiently to secure a fine degree of dispersion of the moisture of the water throughout the oil and permitting the oil to crystallize at or slightly below its congealing point.

3. The method of treating oleomargarine to produce a shortening product of improved creaming quality which comprises supercooling liquid oleomargarine to a temperature considerably below its congealing point, agitating the supercooled liquid oleomargarine sufficiently to secure a fine dispersion of the moisture content and then allowing the product to crystallize at a temperature slightly below its congealing point.

4. The method of treating emulsified shortening products which comprises supercooling the melted emulsion below its congealing point, agitating while so supercooled and yet liquid, to secure a fine dispersion of the moisture content, packaging the supercooled liquid and allowing it to solidify without contact with any chilling medium.

5. The method of chilling emulsified shortening products which comprises supercooling the melted emulsion to a temperature such that the heat of crystallization will bring the product to a temperature just below the normal congealing point of the oil and thereafter permitting it to solidify without contact with any chilling medium.

6. The method of treating emulsified shortening products which comprises rapidly supercooling the melted emulsion to below the melting point of the oil without effecting any appreciable crystallization, withdrawing the product from such cooling treatment while still in the fluid state and before any appreciable crystallization has taken place or heat of crystallization removed, the supercooling of the liquid product being such that the heat of crystallization of the oil will raise the temperature of the product to just below its normal congealing point and permitting the supercooled liquid product to crystallize whereby the product rapidly sets to a solid product out of contact with the chilling medium.

7. The method of preparing solid emulsions which comprises mixing melted oil with moisture, rapidly supercooling the liquid product without appreciable crystallizing or solidifying thereof to a temperature sufficiently below the normal congealing point of the oil such that the heat of crystallization will raise the oil to just below its normal congealing point, agitating to secure fine dispersion of the moisture throughout the continuous phase, withdrawing the supercooled product while still in a liquid condition and without appreciable crystallization from contact with the chilling medium and permitting the supercooled product to solidify with rise of temperature due to crystallization to a temperature just below the normal congealing point of the oil.

8. The method of preparing oleomargarine which comprises mixing melted oil with moisture, rapidly supercooling the liquid product without appreciable crystallizing or solidifying thereof to a temperature sufficiently below the normal congealing point of the oil such that the heat of crystallization will raise the oil to just below the normal congealing point, agitating to secure fine dispersion of the moisture throughout the continuous phase, withdrawing the supercooled product while still in a liquid condition and without appreciable crystallization from contact with the chilling medium and permitting the supercooled product to solidify with rise of temperature due to crystallization to a temperature just below the normal congealing point of the oil.

9. The method of emulsifying oil with moisture which comprises mixing to form a coarse emulsion, supercooling the oil to a temperature such that the heat of crystallization will bring the product to a temperature just below the normal congealing point of the oil, agitating the mixture while in a fluid condition to obtain a fine degree of dispersion of the moisture throughout the supercooled oil and then permitting the emulsion to crystallize at a temperature slightly below the normal congealing point of the oil.

10. The method of preparing emulsions of oil and moisture which comprises cooling the oil to a temperature below its normal congealing point such that the heat of crystallization will bring the product to a temperature just below the normal congealing point of the oil and while the oil is in a supercooled condition but before the oil has crystallized, emulsifying moisture with the oil and thereafter permitting the oil in the emulsion to crystallize at a temperature slightly below the normal congealing point of the oil.

11. The method of treating an emulsion containing oil and moisture which comprises supercooling the melted emulsion to a temperature below its congealing point such that the heat of crystallization will bring the product to a temperature just below the normal congealing point of the oil, agitating while so supercooled and yet liquid to secure a finely dispersed emulsion and thereafter allowing the supercooled liquid to solidify at a temperature slightly below the normal congealing point of the oil.

12. The method of preparing emulsions of oil and moisture which comprises cooling the oil to a temperature below its normal congealing point and while the oil is in a supercooled liquid condition, emulsifying moisture with the oil, removing the emulsion from contact with the chilling medium and thereafter permitting the oil in the emulsion to congeal.

13. The method of chilling emulsified shortening products which comprises supercooling a melted emulsion to a temperature such that the heat of crystallization will bring the product to a temperature just below the normal congealing point of the oil in the emulsion, agitating the supercooled emulsion while yet liquid to secure a fine dispersion of moisture and thereafter permitting it to solidify without contact with any chilling medium.

14. The method of preparing solid emulsions which comprises supercooling a melted mixture of oil and moisture to a temperature such that the heat of crystallization will bring the product to a temperature just below the normal congealing point of the oil in the mixture and thereafter solidifying the emulsion at a temperature slightly below the normal congealing point of the oil in the mixture.

ROY C. NEWTON.
WALTER F. BOLLENS.
LEO C. BROWN.